(12) United States Patent
Traw et al.

(10) Patent No.: US 8,301,881 B2
(45) Date of Patent: Oct. 30, 2012

(54) PROACTIVE FORCED RENEWAL OF CONTENT PROTECTION IMPLEMENTATIONS

(75) Inventors: C. Brendan S. Traw, Portland, OR (US); Michael S. Ripley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/105,125

(22) Filed: May 11, 2011

(65) Prior Publication Data

US 2011/0213970 A1    Sep. 1, 2011

Related U.S. Application Data

(63) Continuation of application No. 12/152,299, filed on May 14, 2008, now Pat. No. 7,958,350, which is a continuation of application No. 10/823,947, filed on Apr. 13, 2004, now Pat. No. 7,392,381.

(51) Int. Cl.
*H04L 29/06* (2006.01)
(52) U.S. Cl. ........................ 713/158; 713/156; 713/155
(58) Field of Classification Search ........................ None
See application file for complete search history.

(56) References Cited

U.S. PATENT DOCUMENTS

| 7,272,229 | B2 | 9/2007 | Nakano et al. | |
|---|---|---|---|---|
| 7,328,337 | B2 | 2/2008 | Roskind | |
| 7,480,939 | B1 | 1/2009 | Nessett et al. | |
| 7,542,568 | B2 | 6/2009 | Ohmori et al. | |
| 2012/0124386 | A1* | 5/2012 | Lin et al. | 713/182 |
| 2012/0131344 | A1* | 5/2012 | Bellwood et al. | 713/176 |
| 2012/0137135 | A1* | 5/2012 | Kasahara et al. | 713/176 |

OTHER PUBLICATIONS

Staring et al., "Revocation in the Video Content Protection System", International Conference on Consumer Electronics, (ICCE '06), Digest of Technical Papers, Jan. 7-11, 2006, pp. 105-106.
He et al., "Server-Aided Digital Signature Protocol Based on Password", 39th Annual 2005 International Carnahan Conference on Security Technology, (CCST '05), Oct. 11-14, 2005, pp. 89-92.
Millen et al., "Certificate Revocation the Responsible Way", Proceedings on Computer Security, Dependability and Assurance: From Needs to Solutions, 1998, Jul. 7-9 & Nov. 11-13, 1998, pp. 196-203.
Kamite et al, "TKEY Secret Key Renewal Mode"; NTT Communications, The University of Tokyo, May 11, 2002, 18 pages.
Brendan, "Technical Challenges of Protecting Digital Entertainment Content", Computer, vol. 36, Issue 7, Jul. 2003, pp. 72-78.
http://www.intel.com/pressroom/kits/bios/traw.htm, year 2007.

* cited by examiner

*Primary Examiner* — David Y Jung
(74) *Attorney, Agent, or Firm* — Grossman, Tucker, Perreault & Pfleger, PLLC

(57) ABSTRACT

A method, apparatus, and system for proactive forced renewal of content protection implementations in devices. The method includes, on a first substantially periodic basis, automatically pushing a new content protection implementation to a device that contains an existing content protection implementation; wherein the existing content protection implementation comprises (a) existing software for presenting protected content and (b) an existing key to facilitate presentation of protected content; and wherein the new content protection implementation comprises a new key to supersede the existing key for facilitating presentation of protected content. On a second substantially periodic basis, the method includes automatically pushing revocation data to the device, the revocation data to identify a plurality of revoked keys, each revoked key of the plurality of revoked keys comprising a key that has been superseded by the new key of the new content protection implementation.

25 Claims, 3 Drawing Sheets

PROACTIVE FORCED RENEWAL OF CONTENT PROTECTION IMPLEMENTATIONS

BACKGROUND

This application is a continuation of U.S. patent application Ser. No. 12/152,299, entitled "PROACTIVE FORCED RENEWAL OF CONTENT PROTECTION IMPLEMENTATIONS," filed May 14, 2008) which is continuation of the U.S. patent application Ser. No. 10/823,947, entitled "PROACTIVE FORCED RENEWAL OF CONTENT PROTECTION IMPLEMENTATIONS," filed Apr. 13, 2004 now U.S. Pat. No. 7,392,381. The entire teachings of the above applications are incorporated herein by reference.

FIELD

Description

Various mechanisms exist for protecting digital content when the content is distributed on a storage medium such as a compact disk read only memory (CD-ROM) or a digital versatile disk (DVD), or distributed via broadcast technologies. Typically, such mechanisms use some form of cryptography to protect the content.

In one system used for protecting content on DVDs, a single symmetric key is assigned to each manufacturer of DVD players. The DVD player uses the shared symmetric key embedded within the device to decrypt the content on the DVD and play it for a user. However, if one of the manufacturer's devices is attacked and the shared symmetric key is compromised, the key may be communicated to others to pirate the content. To attempt to stop this activity, the manufacturer may wish to revoke authorization of the key, thereby preventing further usage of the shared key. However, revocation of the single shared key would render all of the manufacturer's devices inoperable. Thus, this scheme does not practically support revocation of compromised keys.

Another system uses individual symmetric keys for each device. When a key is compromised, the compromised key may be added to a revocation list, or a broadcast encryption key block may be generated that revokes the compromised key. The revocation list or key block may be communicated to playback devices so that playback of the content by a device with compromised keys may be prevented. However, when many keys are compromised over time, the revocation list of compromised keys or a key block to be sent to playback devices may become very large and unmanageable. If the number of playback devices becomes very large (in the thousands or millions), then distribution of updated revocation lists or key blocks becomes problematic.

Content providers, broadcasters, and distributors must devise new methods for mass distribution of digital content to consumer devices in ways that deter piracy, yet do not include revocation mechanisms having undesirable side effects for the consumer.

BRIEF DESCRIPTION OF THE DRAWINGS

The features and advantages of the present invention will become apparent from the following detailed description of the present invention in which.

DETAILED DESCRIPTION

Figure 1:
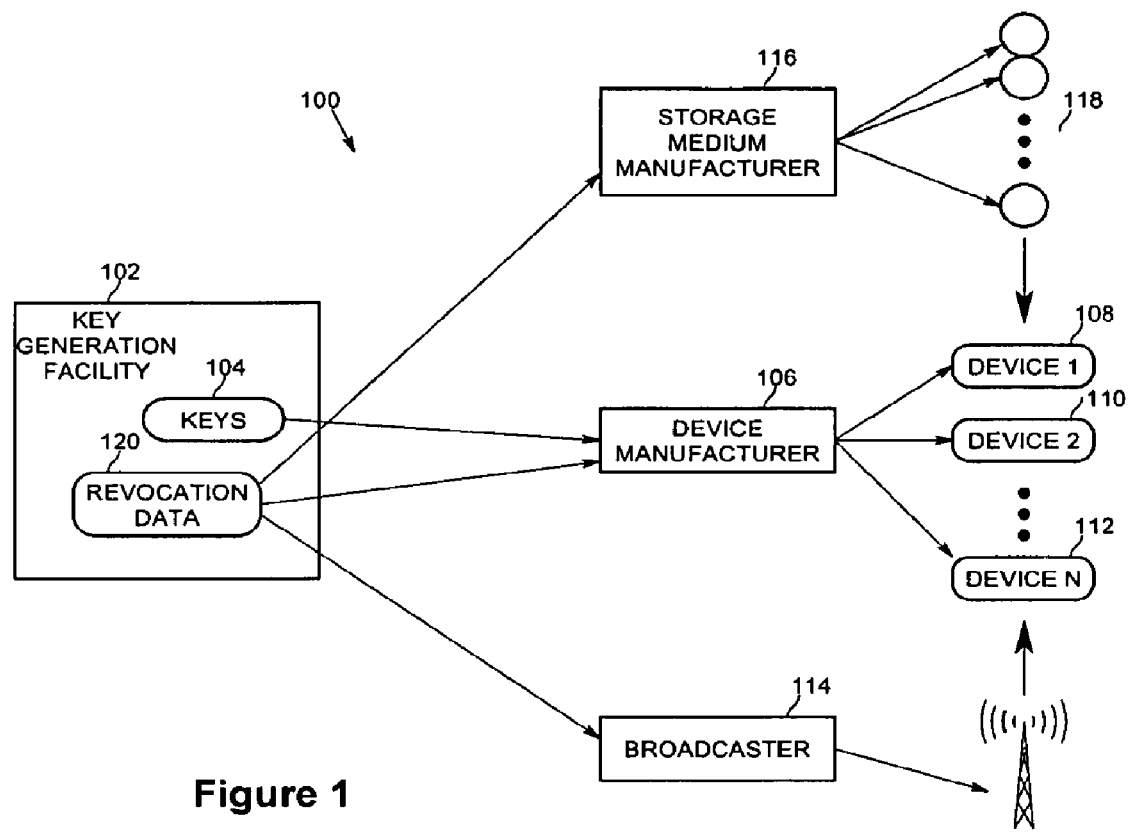
FIG. 1 is a diagram of a content protection system according to an embodiment of the present invention.

An embodiment of the present invention is a system wherein revocation of cryptographic keys is used in combination with periodic renewal of compliant content protection implementations in a way that dramatically improves the security of the overall content protection system. In the present invention, devices for accessing protected content must be periodically renewed. In conjunction with the renewal mechanism, revocation is also used to prevent access to content if the devices' keys have been compromised.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention are applicable to security applications in general, but are described herein in terms of their use in a system for protecting content (such as audiovisual entertainment content) against unauthorized access, copying or distribution. The security systems include means for revoking implementations, including but not limited to content protection systems. In the case of a content protection system, embodiments of the present invention may be used by content providers and implementers of consumer electronics devices, especially where those devices may include software for assisting in implementing content protection and wherein the software may be updated via a communication mechanism (such as via the Internet, for example). Such systems employ a cryptographic protocol through which content is encrypted, so that decryption should only be possible by devices whose compliance with rules for use of that content is verified via authentication. As used herein, such devices may be any consumer electronics equipment such as DVD players, analog and digital televisions (TVs) (including high definition TVs), digital video recorders (DVRs), set top boxes (e.g., cable and satellite TV receivers), personal video players (PVPs), audio receivers, and video cassette recorders (VCRs), as well as software-implemented content player applications executing on personal computers (PCs), or other processing systems. To accomplish this, each such device is provided with secret values (e.g., cryptographic keys) that are only available to compliant devices, and which can be verified (implicitly or explicitly) as part of the process to gain access to the content. In the event that such authentication secret values are compromised and distributed, means are provided for revoking the compromised information. To limit potential negative effects of such revocation on consumers, revocable information may be assigned on a fine granularity (e.g., uniquely to each product), or, if revocable information is common to a large number of products, such products may be required to be renewable (i.e. replaceable) in the event of revocation.

Embodiments of the present invention may be applicable where devices compliant with a given protection system are implemented in updateable software or firmware, although embodiments of the invention may be applied to any renewable content protection implementation. Content protection implementations are required in embodiments of this invention to be proactively renewed (i.e., replaced) by their implementer on a periodic basis, independent of whether revocation has occurred. In one embodiment, the renewal is achieved by an on-line download of at least a portion of a new content protection implementation, although other mechanisms may also be used (e.g., distribution of CDROMs or DVDs with the updated software). A would-be attacker wishing to design and distribute a means of circumventing such compliant implementations (e.g., by a software patch causing an implementation to operate in a non-compliant manner) will be thwarted if implementations periodically cease to be capable of accessing (e.g. decrypting) content and are replaced by new implementations not vulnerable to the same circumvention. To ensure this, authentication secrets issued to such implementations are, using embodiments of the present invention, proactively revoked on a periodic basis.

In one embodiment, revocation could occur at the same frequency at which renewal is required, with a fixed delay between renewal and revocation. For example, if renewal is required at least once a year, for example no later than December, then authentication secrets corresponding to such implementations may be revoked once a year, starting in the following January. In this way, periodic revocation serves to enforce periodic renewal. The revocation frequency may be set to any time period (e.g., annually, monthly, weekly, etc.), depending on the requirements of a particular implementation. The revocation frequency may be changed depending on circumstances (e.g., if there exists more hacker activity, perform revocation more frequently).

Because there are limits (arising from technological and/or practical constraints) to the number of revocations that a given content protection system can support, one concern with the present invention is that it might prematurely exhaust the revocation capacity of a system. However, since product implementations are replaced regularly, revocable information may be assigned in common to a large number of devices without fear of adverse consumer impact. Therefore, the number of authentication secrets that need to be revoked by each periodic revocation may be kept small.

Furthermore, some systems may be able to exploit the predictability of periodic revocations to gain further efficiencies. For example, in a content protection system based on public key cryptography, revocation may entail distributing a list of key IDs to be revoked, where each revocation list entry may specify either a single key ID or a range (e.g., starting and ending values) of key IDs. For such a system, a particular range of key IDs may be reserved for all keys that will be subject to periodic revocation, and key IDs within that range may be assigned starting at one end (such as the bottom) of the range and working contiguously over time to another end (such as the top) of the range as keys subject to periodic revocation are produced. In that case, the revocation list for each periodic revocation may comprise a single entry specifying a range starting with the first ID in the reserved range and ending with the highest ID in the reserved range that had been issued by the end of the corresponding renewal period. Thus, the amount of data in a revocation list to be transmitted to devices remains somewhat constant, instead of growing significantly larger over time as in prior systems.

As another example, a content protection system based on broadcast encryption technology may entail revocation based on a hierarchy of symmetric keys, or other arrangement, where space-efficient revocation of a contiguous range of keys may be accomplished with embodiments of the present invention. In that case, a range of keys could be reserved for assignment to implementations that are subject to periodic revocation, and keys within that range assigned contiguously over time. For example, a set of revoked keys may form a sub-tree of the key hierarchy, thereby allowing revocation of a particular key to also indicate revocation of all keys in the key hierarchy derived from that key.

FIG. 1 is a diagram of a content protection system 100 according to an embodiment of the present invention. In this system, revocation of keys may be performed proactively on a periodic basis, rather than only reactively in response to an attack, as in prior systems. A key generation facility 102 generates cryptographic keys 104 for protecting content. The keys may be used in any suitable cryptographic system for protecting the content. The key generation facility sends the keys to a device manufacturer 106. The device manufacturer includes one or more of the keys in each device (i.e., device 1 108, device 2 110, . . . device N 112) manufactured by the device manufacturer according to the content protection implementation used for a device. The devices may then be sold and/or distributed to consumers. There may be any number of devices (e.g., thousands or millions of devices). Generally, a broadcaster 114 may broadcast protected content to the devices over any transmission means. Devices 108, 110, to 112 use the keys embedded in their content protection implementations to decrypt and/or otherwise access the protected content broadcast by the broadcaster. Similarly, a storage medium manufacturer 116 may manufacture storage media (such as CDROMS, DVDs, etc.) that include protected content. When the devices operate on the content stored on the storage media 118, the devices use the keys embedded in their content protection implementations to decrypt and/or otherwise access the protected content stored on the storage media. In one embodiment, the storage media manufacturer operates as a content provider, and mass produces storage media storing protected content.

In embodiments of the present invention, the device manufacturer (or other suitable entity) maintains periodic communication with the devices in order to update the content protection implementations stored therein. For example, the device manufacturer may periodically update (i.e., renew) the content player software embedded within a device (or the software itself in embodiments where the device is a software-implemented player application). By implementing periodic renewal, the device manufacturer improves the overall security of the system because if a particular content protection implementation is compromised, the renewal operation will "reset" the implementation, thereby deterring further unauthorized access to content by the device.

The key generation facility determines when revocation of selected keys should occur. This may happen when it becomes known that some keys have been compromised. However, in embodiments of the present invention, a periodic revocation of keys in conjunction with the renewal operation ensures that renewal actually is accomplished. Once a periodic revocation should occur, the key generation facility generates revocation data 120. The revocation data may comprise one or more revoked keys. In one embodiment, the revocation data comprises specification of a range of IDs of keys that are to be revoked. In another embodiment, the revocation data comprises a block of data encrypted by one or more keys in a key hierarchy, such that only non-compromised keys in the key hierarchy can be used to successfully process that data and thereby derive a key for accessing the content.

The key generation facility distributes the revocation data in several ways. In one embodiment, the revocation data may be sent to the storage medium manufacturer for inclusion on subsequently manufactured blank disks and/or pre-recorded disks. In this case, when the storage media is read by the device, the device processes the new revocation data. In one embodiment, the device overwrites any pre-existing revocation data with the newly received revocation data. In another embodiment, the revocation data may be sent to the device manufacturer for inclusion in subsequently manufactured devices. In yet another embodiment, the revocation data may be sent to the broadcaster for inclusion in a broadcast transmission to devices. When a device receives the revocation data in broadcast content, the device processes the data. Regardless of the mechanism used to update the revocation data, when a device attempts to access protected content in a content protection implementation, the revocation data is checked or processed so that if the key required to decrypt the content is encompassed in the revocation data, then a device with the revoked keys is not able to access to the content.

Figure 2:
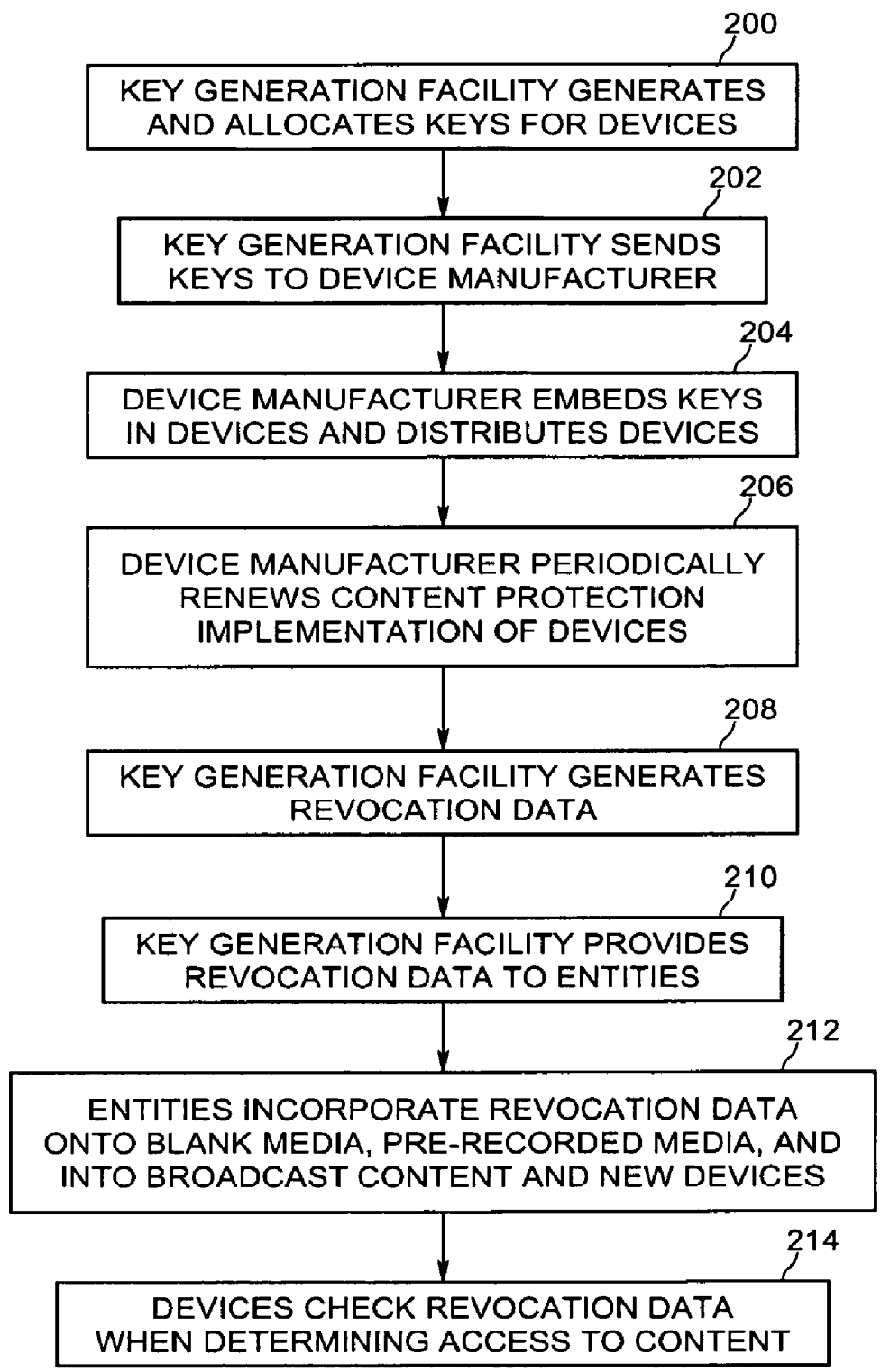
FIG. 2 is a flow diagram illustrating pro-active forced renewal of a content protection implementation according to an embodiment of the present invention.

FIG. 2 is a flow diagram illustrating forced renewal of a content protection implementation according to an embodiment of the present invention. At block 200, the key generation facility generates and allocates keys for devices. In at least one embodiment, keys may be allocated to multiple device manufacturers and multiple devices based on a scheme where keys must be periodically renewed using an efficient revocation mechanism over time. In one embodiment, the keys for a given manufacturer may be contiguous in a range. Each key may comprise a bit string of a predetermined length (e.g., 56 bits, 128 bits, etc.) and may also include an expiration date, such that the key may be scheduled to be revoked on a certain date or after a certain number of days has transpired. At block 202, the key generation facility sends the keys to at least one device manufacturer.

Next, at block 204, the device manufacturer embeds the keys in manufactured devices and distributes the devices through typical commercial channels. The device manufacturer includes a communications capability in the devices to cause the periodic renewal of the devices' content protection implementations. In one embodiment, the renewal may be done by downloading software to the devices over an on-line connection using techniques well known in the art. At block 206, the device manufacture periodically renews the content protection implementations included in the devices. As part of the renewal process, the device manufacturer may include new keys (previously provided by the key generation facility) in the new content protection implementation installed in the devices. In one embodiment, the device manufacturer may perform the renewal periodically, according to any selected frequency. Depending on market and suspected piracy conditions, or other events, the device manufacturer may increase or decrease the frequency of renewal. In one embodiment, the device manufacturer may have a renewal ready at all times for "emergency" communication to the devices.

In conjunction with the renewal mechanism, at block 208 the key generation facility generates revocation data. The revocation data comprises information covering keys that are to be revoked such that devices having revoked keys cannot access protected content using the revoked keys. In one embodiment, the revocation data comprises a compact representation of revoked keys, such as a listing of one or more ranges of key certificate IDs and/or encryption using one or more selected keys in a key hierarchy. In either case, the size of the revocation data does not grow significantly based on increasing numbers of revoked keys. In one embodiment, the revocation data may be constructed by examining specified expiration dates of selected keys. The revocation data may be generated at a time relative to the expiration date (e.g., the expiration date plus a selected number of days), or may be generated as of a date certain (e.g., every December 31). The revocation data may be signed by the key generation facility to ensure its integrity. At block 210, the key generation facility provides the revocation data to entities in the current system, such as one or more of the device manufacturers, the storage media manufacturers, and the broadcasters. In one embodiment, the transfer of revocation data among devices may be performed by peer-to-peer communication between devices. In one embodiment, generation of revocation data may trigger transmission of messages to users and/or devices announcing that renewal and/or revocation will be performed. In another embodiment, the revocation and renewal operations are transparent to the users.

Figure 3:
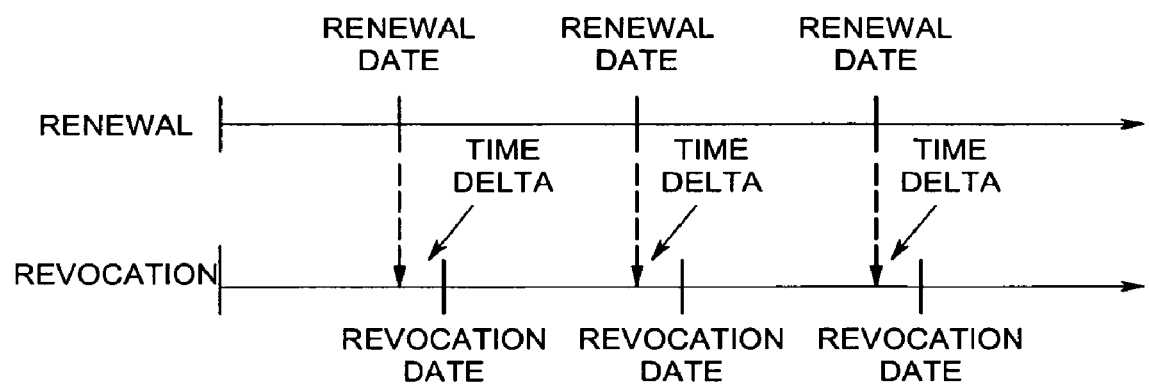
FIG. 3 is a diagram illustrating an exemplary renewal and revocation timeline according to an embodiment of the present invention.

FIG. 3 is a diagram illustrating an exemplary renewal and revocation timeline according to an embodiment of the present invention. In one embodiment, proactive forced revocation of keys may take place a predetermined amount of time after a renewal of the content protection implementation. For example, in one embodiment the revocation data may be communicated by the key generation facility a certain number of days (designated as time delta in FIG. 3) after periodic renewal.

As depicted in the figure, revocation data may be sent periodically in conjunction with the renewal scheme, instead of in response to a known compromise of one or more keys. In some cases, the attempt to renew the content protection implementation may fail. By performing the revocation of keys after a scheduled renewal, when the renewal failed for any reason, the overall security of the system is improved by forcing the content protection implementations to update the revocation data. In one embodiment, the renewal may take place according to one of several timings. For example, the renewal may be performed at an earliest possible time before expiration of keys, or at in a "just in time" manner.

At block 212, the entities incorporate the newly received revocation data onto blank media, pre-recorded media, and into broadcast content, and into new devices and previously distributed devices. The storage media manufacturers embed the new revocation data into new blank media and pre-recorded media using techniques well known in the art. Similarly, the device manufacturers embed the new revocation data into newly manufactured devices. In one embodiment, the device manufacturers also download the new revocation data into previously distributed devices over an on-line connection. Broadcasters also may embed the new revocation data into broadcast content (e.g., in a media key block) transmitted to existing devices. Any one or more of these actions may take place after the revocation data is generated and communicated to the entities. At block 214, the devices now have the updated revocation data and access to content is determined by checking or processing the revocation data.

In conjunction with embodiments of this invention, additional flexibility regarding criteria for non-scheduled revocation is also possible. For example, existing content protection systems typically allow revocation to be used only in cases where the keys to be revoked have been compromised (e.g., extracted from a device and made public). These systems do not allow revocation to be used to address other problems, such as a design flaw whereby an entire a product line mishandles protected content, because of the adverse impact such use would have on all consumers who innocently purchased such a product. However, where the enforced renewal approach of embodiments of the present invention is used, such a consumer impact would be mitigated by the fact that implementations are ensured to be renewable. Therefore, use of revocation may be expanded to cover a more general set of threats, such as device non-compliance, a "class attack" applicable to all devices of a particular design, etc. In such cases, renewal may be required on a more expedited basis than the regular periodic renewal described above.

Although the operations described herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for automatically renewing content protection implementations in devices, the method comprising:
    on a first substantially periodic basis, automatically pushing a new content protection implementation to a device that contains an existing content protection implementation;
    wherein the existing content protection implementation comprises (a) existing software for presenting protected content and (b) an existing key to facilitate presentation of protected content; and
    wherein the new content protection implementation comprises a new key to supersede the existing key for facilitating presentation of protected content; and
    on a second substantially periodic basis, automatically pushing revocation data to the device, the revocation data to identify a plurality of revoked keys, each revoked key of the plurality of revoked keys comprising a key that has been superseded by the new key of the new content protection implementation;
    wherein the revocation data is automatically pushed to the device on the second substantially periodic basis only after a corresponding new content protection implementation has already been pushed to the device to equip the device with a replacement key for at least one of the plurality of revoked keys.

2. A method according to claim 1, wherein the first substantially periodic basis and the second substantially periodic basis have substantially the same period.

3. A method according to claim 1, wherein:
    the first substantially periodic basis and the second substantially periodic basis have substantially the same period; and
    the method further comprises waiting for a delay period after pushing the new content protection implementation to the device, before pushing corresponding revocation data to the device, thereby causing the second substantially periodic basis to follow the first substantially periodic basis by the delay period.

4. A method according to claim 1, wherein the revocation data is encrypted and can be decrypted by the new key of the new content protection implementation.

5. A method according to claim 1, wherein the operation of pushing the new content protection implementation to the device comprises:
    storing the new content protection implementation in a storage medium to be used by the device.

6. A method according to claim 5, wherein the operation of storing the new content protection implementation in the storage medium comprises storing the new content protection implementation in at least one medium from the group consisting of:
    a substantially blank storage medium; and
    a pre-recorded storage medium.

7. A method according to claim 1, further comprising:
    receiving the revocation data, at a broadcaster, from a key generation facility; and
    broadcasting, for reception by multiple devices, broadcast content that includes the revocation data.

8. A method according to claim 1 wherein
    the revocation data identifies the plurality of revoked keys using two values that identify a range of more than two revoked keys.

9. An apparatus, comprising:
a tangible, machine-accessible storage memory; and
instructions in the machine-accessible storage memory which, when executed by a processing system, cause the processing system to perform operations comprising:
on a first substantially periodic basis, automatically pushing a new content protection implementation to a device that contains an existing content protection implementation;
wherein the existing content protection implementation comprises (a) existing software for presenting protected content and (b) an existing key to facilitate presentation of protected content; and
wherein the new content protection implementation comprises a new key to supersede the existing key for facilitating presentation of protected content; and
on a second substantially periodic basis, automatically pushing revocation data to the device, the revocation data to identify a plurality of revoked keys, each revoked key of the plurality of revoked keys comprising a key that has been superseded by the new key of the new content protection implementation;
wherein the revocation data is automatically pushed to the device on the second substantially periodic basis only after a corresponding new content protection implementation has already been pushed to the device to equip the device with a replacement key for at least one of the plurality of revoked keys.

10. An apparatus according to claim 9, wherein the first substantially periodic basis and the second substantially periodic basis have substantially the same period.

11. An apparatus according to claim 9, wherein:
the first substantially periodic basis and the second substantially periodic basis have substantially the same period; and
the operations comprise waiting for a delay period after pushing the new content protection implementation to the device, before pushing corresponding revocation data to the device, thereby causing the second substantially periodic basis to follow the first substantially periodic basis by the delay period.

12. An apparatus according to claim 9, wherein the revocation data is encrypted and can be decrypted by the new key of the new content protection implementation.

13. An apparatus according to claim 9, wherein the operation of pushing the new content protection implementation to the device comprises:
storing the new content protection implementation in a storage medium to be used by the device.

14. An apparatus according to claim 13, wherein the storage medium comprises at least one medium from the group consisting of:
a substantially blank storage medium; and
a pre-recorded storage medium.

15. An apparatus according to claim 9, wherein the operations comprise:
receiving the revocation data from a key generation facility; and
pushing the received revocation data to the device.

16. An apparatus according to claim 9, wherein the operation of pushing the revocation data to the device comprises:
including the revocation data in broadcast content transmitted by a broadcaster for reception by multiple devices.

17. An apparatus according to claim 9, wherein
the revocation data identifies the plurality of revoked keys using two values that identify a range of more than two revoked keys.

18. A device, comprising:
a processor;
a machine-accessible medium responsive to the processor;
an existing content protection implementation comprising (a) existing software for presenting protected content and (b) an existing key to facilitate presentation of protected content; and
instructions in the machine-accessible medium which, when executed by the device, enable to device to perform operations comprising:
receiving a new content protection implementation pushed to the device, the new content protection implementation comprising a new key to supersede the existing key for facilitating presentation of protected content;
replacing the existing key with the new key from the new content protection implementation; and
after replacing the existing key with the new key from the new content protection implementation, receiving revocation data, wherein (a) the revocation data is pushed to the device and (b) the revocation data identifies a plurality of revoked keys, wherein at least one revoked key of the plurality of revoked keys has been superseded by the new key from the new content protection implementation.

19. A device according to claim 18, wherein the instructions enable the device to use new content protection implementations that are pushed to the device on a substantially periodic basis without regard to whether or not existing keys have been compromised.

20. A device according to claim 18, wherein the instructions enable the device to use revocation data that is pushed to the device on a second substantially periodic basis that follows the first periodic basis by a delay period.

21. A device according to claim 18, wherein the device comprises an information handling device from the group consisting of:
a consumer electronics device for accessing protected content; and
a software-implemented player application for accessing protected content.

22. A device according to claim 18, wherein the operation of receiving the new content protection implementation comprises receiving the new content protection implementation from a pre-recorded storage medium.

23. A device according to claim 18, wherein the operation of receiving the revocation data comprises receiving the revocation data from broadcast content transmitted by a broadcaster for reception by multiple devices.

24. A device according to claim 18, wherein the operations comprises:
after receiving the new content protection implementation with the new key and replacing the existing key with the new key, using the new key from the new content protection implementation to decrypt the revocation data.

25. A device according to claim 18 wherein the revocation data identifies the plurality of revoked keys using two values that identify a range of more than two revoked keys.

* * * * *